United States Patent [19]

Mason, III

[11] Patent Number: 4,685,230

[45] Date of Patent: Aug. 11, 1987

[54] ADJUSTABLE BIAXIAL STRETCHER

[76] Inventor: William H. Mason, III, 902 Goodrich Ave., St. Paul, Minn. 55105

[21] Appl. No.: 876,980

[22] Filed: Jun. 20, 1986

[51] Int. Cl.$^4$ ............................................. D06C 3/08
[52] U.S. Cl. .................................... 38/102.5; 264/291
[58] Field of Search ................ 26/72, 1; 264/290.2, 264/235.8, 291; 38/102.91, 102.5, 102.4; 425/DIG. 48, DIG. 53; 269/111, 119, 41, 42

[56] References Cited

U.S. PATENT DOCUMENTS

| | | | |
|---|---|---|---|
| 1,546,400 | 7/1925 | Nichols | 38/102.5 |
| 2,608,750 | 9/1952 | Cluzel | 38/102.4 |
| 2,759,217 | 8/1956 | Peterson | 38/102.4 |
| 2,912,716 | 11/1959 | Frownfelter et al. | 26/1 |
| 3,553,862 | 1/1971 | Hamu | 38/102.1 |
| 3,635,640 | 1/1972 | Wood | 264/290.2 X |
| 3,896,573 | 7/1975 | Gibby | 38/102.5 |
| 4,332,366 | 6/1982 | Descals et al. | 261/111 |
| 4,571,864 | 2/1986 | Bopp | 38/102.5 |

Primary Examiner—Werner H. Schroeder
Assistant Examiner—Andrew M. Falik
Attorney, Agent, or Firm—Anthony G. Eggink

[57] ABSTRACT

An adjustable stretcher device for positioning and holding frame structures of various dimensions and for biaxially tensioning a screen fabric across the frame structures for subsequent fastening. The adjustable stretcher is comprised of a generally rectalinear and flat base member, a pair of elongated opposing and perpendicularly disposed track members secured to the base member, and adjustable clamping members for slidingly engaging each track member. Elongated stretcher modules having sloping shoulder portions and a plurality of needles extending therefrom are provided for the adjustable communication with the clamping members. The adjustable movement of the clamping members on the track members and the adjustable movement of the stretcher module bodies with respect to the clamping members permit screen fabric materials to be biaxially tensioned across a frame structure placed within the perimeter of the stretcher module bodies.

20 Claims, 8 Drawing Figures

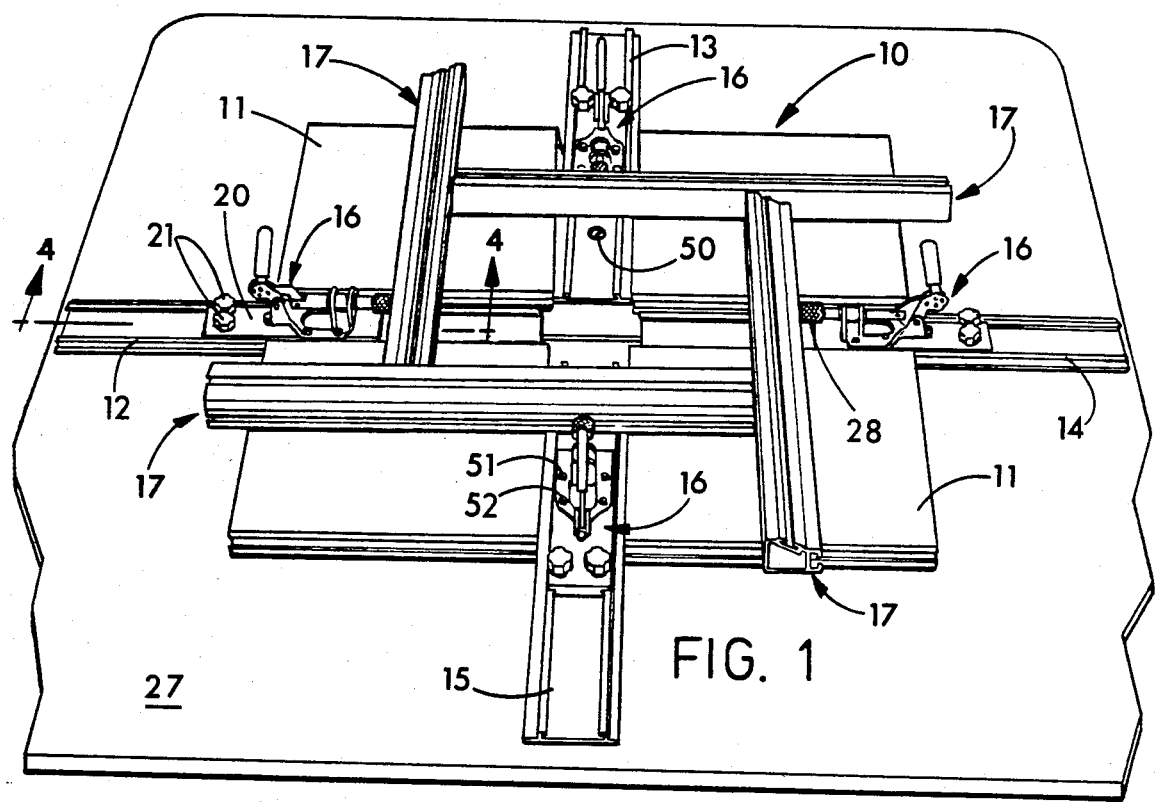
FIG. 1
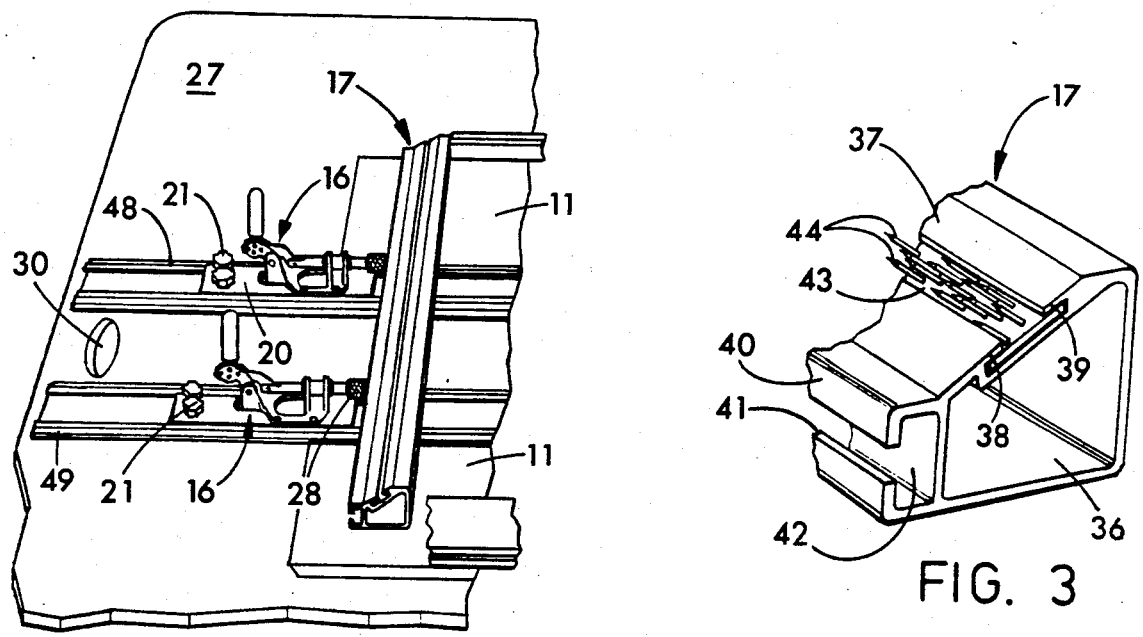
FIG. 2
FIG. 3

ADJUSTABLE BIAXIAL STRETCHER

BACKGROUND OF THE INVENTION

This invention relates to a device for stretching and holding screen fabric materials across a frame structure for subsequent securement. Particularly, this invention relates to an adjustable stretcher device for biaxially stretching screen fabric materials across frame structures of various sizes to prepare frames for use in the screen printing, milling and industrial sifting industries.

The adjustable stretcher device according to the invention is useful for providing a bidirectionally or biaxially tensioned screened fabric material for fastening to the peripheral portions of a frame structure.

The adjustable stretcher device of the invention permits frame structures of a wide size range to be held and secured for receiving a biaxially tensioned screened fabric material. And, the device provides a plurality of adjustable elements to permit a user to uniformly and precisely tension the screen fabric across the frame structure so that it can subsequently be quickly and securely fastened to the frame.

The uniform and precise tensioning of screened fabric frame structures are necessary in serigraphic or screen printing processes to achieve proper printing results. And, heretofore, the frame making art has been void of an economical stretcher device which adjustably permits a range of frame sizes to be properly fitted with tensioned screen fabric material for use in the screen printing industry generally, and for use in the milling industry particularly.

In the past, several types of stretcher devices have been proposed or utilized for use in frame making. However, these devices have been limited in functionality or they have been designed for use in specific frame size applications. Additionally, these prior art devices have been expensive to manufacture and, therefore, further limited in use in the overall marketplace.

The adjustable stretcher device of this invention overcomes the limitations, difficulties and shortcomings of these prior art devices. The stretcher device of the invention provides a versatile, functional, inexpensive and easy to operate device that permits the user to produce a bidirectionally and uniform tensioned screened frame as required for use in the serigraphic printing industry. And, despite the longstanding need for such a stretcher device in the industry, none in so far as is known has been developed.

SUMMARY OF THE INVENTION

The invention is for an adjustable stretcher device to position and hold frame structures of various configurations and dimensions and to biaxially tension a screen fabric across the frame structures for subsequent fastening.

The adjustable stretcher is comprised of a rectalinear and flat base member to support the remaining elements of the device. A pair of elongated opposing and perpendicularly disposed track members are secured to the base member. The track members are fastened to the base member in a generally radial position from the center of the base member. For larger frame sizes or to obtain increased tensioning of the screen fabric, parallely disposed track members are fastened to the base member so that a total of eight track members are provided. Each track member further has an internally disposed sliding groove along its length.

The adjustable stretcher device further has clamping members for slidingly engaging the sliding groove of each track member. Each clamping member has a sliding plate body, adjustable set screws, a handle member, an elongated connector shaft in communication with the handle member and a shaft support cylinder fixed to the sliding plate body.

The sliding plate body is for slidably engaging each internally disposed groove member of the rail members. Each connector shaft is internally threaded to receive a threaded adjustment member having a widened end portion, a speed adjusting nut and a threaded end shaft portion for rotational movement in the connector shaft to further permit the tensioning adjustment of the screen fabric and to control the locking movement of the clamping member handle.

The stretcher device is further comprised of an elongated stretcher module body having a body member with a sloping shoulder portion and a plurality of needle bars extending therefrom. The elongated stretcher module body has a longitudinally extending channel member therein for adjustably receiving the widened end portion of the threaded adjustment member.

The stretcher module further has an internally disposed elongated apertured channel section at its sloping shoulder portion for receiving the needle bars which engage the screen fabric. The sloping shoulder portion is further disposed at a predetermined angle for the optimal engagement of the screen fabric material. The needle bars are comprised of a plurality of bar sections. The bars have three rows of needles extending therefrom, each of the three rows of needles disposed at a predetermined angle with respect to the sloping shoulder portion of the stretcher module.

The movement and setting of the clamping members in the track members, the movement of the stretcher module body on the widened end portions of the adjustment member, the movement of the handle of the clamping member and the movement of the adjustment member with respect to the connector shaft permits a user to adjust the tension of screen fabric material biaxially across a frame structure placed within the perimeter of the elongated stretcher module bodies.

These and other benefits of this invention will become clear from the following description, by reference to the drawings.

BRIEF DESCRIPTION OF THE DRAWINGS

FIG. 1 is a perspective top view of the adjustable biaxial stretcher device of this invention having a pair of opposing track members and clamping members disposed on its base member;

FIG. 2 is a perspective partial top view of another embodiment of the adjustable biaxial stretcher device of the invention and showing a base member having parallel track members thereon;

FIG. 3 is a perspective partial lateral view of the stretcher module used in the adjustable biaxial stretcher device of the invention;

DESCRIPTION OF THE PREFERRED EMBODIMENTS

Figure 4:
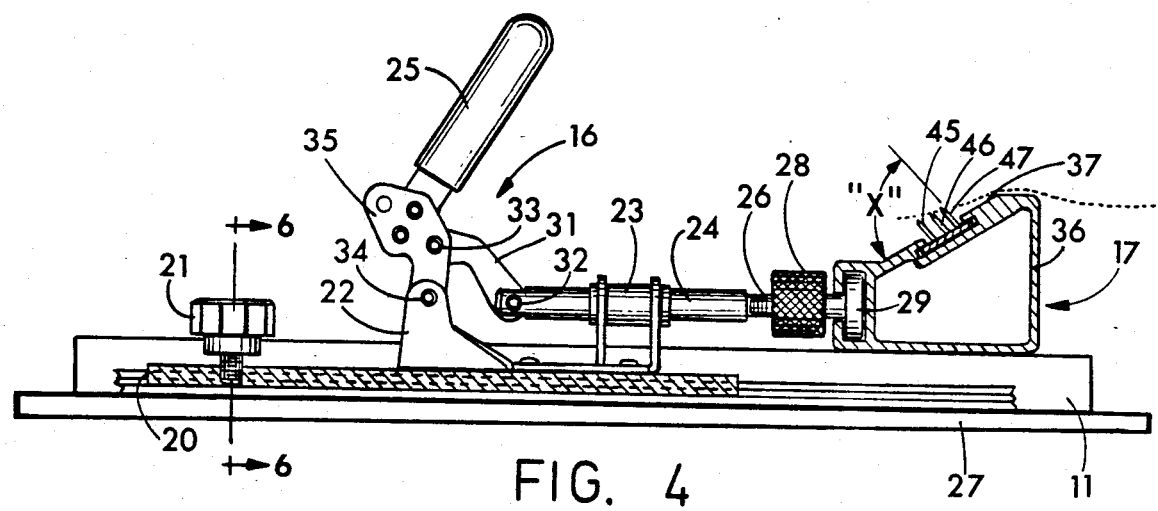
FIG. 4 is a lateral cross-sectional view of the clamping member and adjustable components of this invention taken along lines 4—4 of FIG. 1.

Referring to FIG. 1, an adjustable stretcher device 10 is shown for positioning and holding a frame structure and to biaxially tension a screen fabric material across the frame structure for subsequent securement.

Subsequent the biaxial stretching of the screen fabric material across the frame structure and testing for fabric tension uniformity, the peripheral portions of the screen fabric can easily be secured or fastened to the frame structure by known means. The fastening process can include the use of mechanical fastening means such as staples, nails and the like, or the fastening process can consist of a chemical bonding process as disclosed in Applicant's pending U.S. patent application, filed on 10/25/82 and having Ser. No. 436,197. The latter process is preferred because of its use on a variety of frame constructions, i.e., metal, wood and plastic, because of its ease of application, and because of its uniform fastening results.

The adjustable stretcher device 10 is shown in FIG. 1 to having a mounting board or base member 27 having four radially and oppositely disposed elongated track or rail members 12, 13, 14 and 15 fixed to its top surface by means of screws 50, for example. The clamping members 16 are shown mounted to a sliding plate body 20 by means of fastening screws 51 and 52, for example. Slidably mounted on the elongated track or rail members 12, 13, 14 and 15 are clamping members 16 which are movable in their respective track members and which can be locked in place by means of set screws 21.

Additionally, four frame support members 11 are shown positioned adjacent the track members to support various components of the stretcher device 10 as well as the frame structure that is placed and held therein. Although the base structure 27 is shown to be a one piece member, the base structure 27 can be provided having separable components to provide portability to the stretcher devices of this invention.

Figure 6:
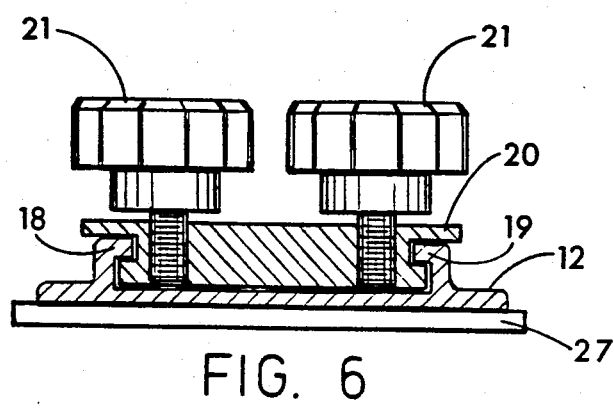
FIG. 6 is a cross-sectional view showing a sliding plate and track member taken along lines 6—6 of FIG. 4.

Slidably mounted and perpendicularly disposed to the clamping members 16 are elongated stretcher modules 17. FIG. 6 further illustrates the elongated track member 12 to have lips 18 and 19 to define a sliding groove for slidably engaging the sliding plate body 20. Adjustable set screws 21 are provided to fix the sliding plate body 20 and thus clamping members 16 to the elongated track member 12.

FIG. 2 illustrates an adjustable stretcher device designed for use with larger frame structure or for use with frame structures requiring an increased amount of fabric tensions. This design also provides a means to more carefully adjust the tension of baggy screen fabrics or fabrics used on frame structures where uniform fabric tensioning is critical. The stretcher device shown has parallely disposed track members 48 and 49 which are of the same construction as those discussed with respect to track members 12, 13, 14 and 15 of FIG. 1. The track members are fastened to the mounting board structure 27 in a spacially parallel configuration so that the elongated stretcher module 17 is slidably engaged and adjustable by the two clamping member assemblies 16 that are slidably engaged in the track members 48 and 49.

Additionally shown are frame support members 11 which provide further support to the stretcher modules 17 as well as the frame structure placed within the inner periphery of the stretcher modules. The frame support members 11 are designed so that the frame structure as well as the stretcher modules 17 rest thereon during the use and operation of the stretcher device. An apertured handle portion 30 located at the periphery of base member 27 is provided so that a user can easily move and transport the stretcher device.

FIG. 3 further shows the elongated stretcher module 17 to be comprised of a body member 36 and having a frontally disposed sloping shoulder portion 37. The module body 36 also has lips 38 and 39 which hold a needle bar body with outwardly extending needles 44 which are used to protrude through the screen fabric material to grasp and hold the screen fabric so that the adjustable stretcher device 10 is able to biaxially stretch the screen fabric across the frame member and to hold it in place for subsequent securement.

Figure 5:
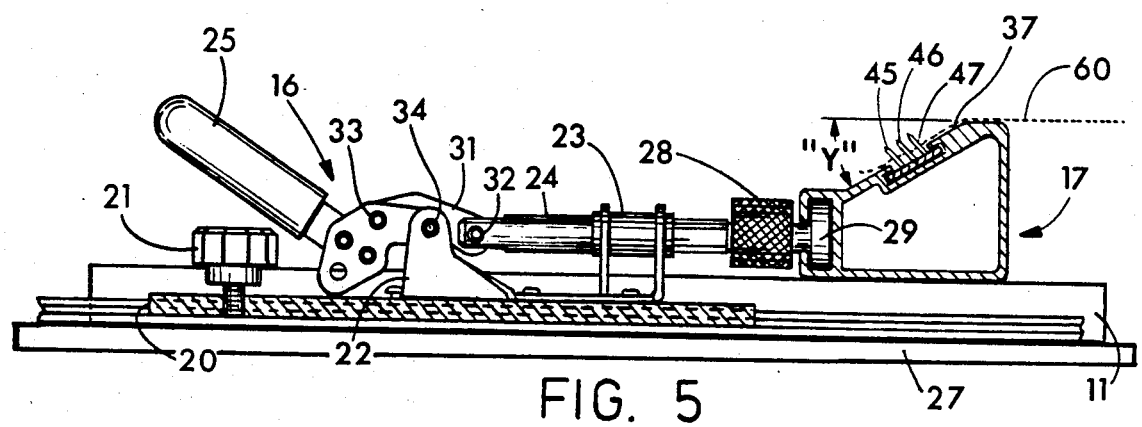
FIG. 5 is a lateral cut away view of the invention shown in FIG. 4 which shows the clamping member in a locked position to stretch a screen fabric across the stretcher module member.

FIG. 4 additionally shows the needles 44 to be arranged in rows 45, 46 and 47, and to have a predetermined angle "X" with respect to the sloping shoulder 37. With reference to FIGS. 4 and 5, wherein the screen fabric material is shown by a dotted line 60, it has been found that a needle angle of about seventy-five degrees is well suited to grasp and hold screen fabric materials. Additionally, with respect to the predetermined angle "Y" of the sloping shoulder 37 of module body 36, it has been found that an angle of about thirty degrees, with respect to a horizontal axis is shown, is well suited to work in conjunction with the needles 44 to hold and stretch screen fabric materials. Thus, the cooperation of the sloping shoulder 37 and needles 44 serve as a screen fabric engaging and grasping means to the adjustable elements of this invention. It is possible, therefore, to utilize other fabric engaging and holding means on the adjustable module body 36, as long as the fabric is grasped and uniformly held, by other mechanical means for example, along the entire length corresponding to the frame size.

Referring to FIGS. 3, 4 and 5, shown located at the front of module body 36 or at the bottom end of sloping shoulder 37 are lip portions 40 and 41 to define a longitudinal channel portion 42. Channel 42 receives the widened end portion 29 of the threaded adjustment member 26 which is connected to shaft 24. The channel 42 and end portion 29 have dimensions so that the module body 36 can be readily moved in a lateral direction on the widened end 29 with respect to the clamping member 16. Therefore, the respective stretcher modules 17 can easily be adjusted into a configuration, as shown in FIG. 1, to accomodate frame structures of various dimensions and configurations.

FIGS. 4 and 5 further illustrate the elements of clamping members 16, and they are shown in operative positions. The clamping member 16 is shown to have a support body 22, a shaft support cylinder 23, an elongated connector shaft 24 and a handle member 25. A lever element 31 is provided to pivotally connect the elongated connector shaft 24 to handle lever element 35 at pivot connections 32 and 33. The handle 25 is shown rigidly secured to handle lever element 35. A pivot connection 34 is provided to pivotally connect the handle lever element 35 and the handle member 25 to the clamping member support body 22. Although the toggle type clamping members 16 are known, they have not, as far as is known, been utilized in the frame stretcher art. As shown particularly in FIG. 5, the clamping member 16 is locked in place when the handle member 25 is placed in a rearward position.

Importantly, FIGS. 4 and 5 illustrate the adjustable nature of adjustable stretcher device 10. The internally threaded connector shaft 24 is shown to have the threaded adjustment member 26 adjustably connected thereto. The adjustment member 26 has an adjustment nut 28 and a widened end portion 29 which is slidably secured in longitudinal channel portion 42 of elongated stretcher module 17. As the knurled adjustment nut 28 is rotated, the adjustment member 26 is moved with respect to connector shaft 24. Thus, the adjustment of nut 28 provides a fine tune adjustment to the tensioning of screen fabric 60 by moving the stretcher module 17 with respect to the plate body 20.

As shown in FIGS. 1, 2, 4 and 5, the frame support members 11 are placed adjacent the track members to provide support for the frame structure and the stretcher modules 17. Particularly as shown in FIGS. 4 and 5, the support member 11 extends above the sliding plate body 20 whereby the stretcher module 17 rests thereon to maintain a level configuration with respect to base member 27. Although the frame structure is not shown, it is preferred that it extend above the stretcher module body 36 approximately ⅛ to ¼ of an inch. To do so, shim members can be added to support members 11.

Figure 7:
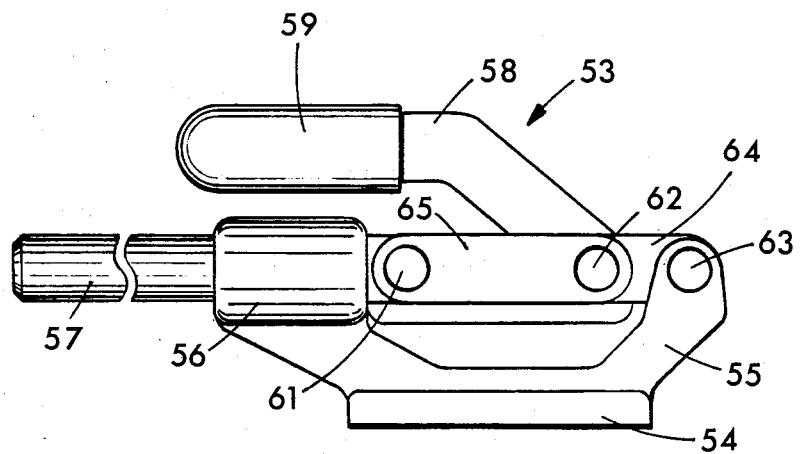
FIG. 7 is a lateral plan view of another clamping member embodiment used in the adjustable biaxial stretcher device.
Figure 8:
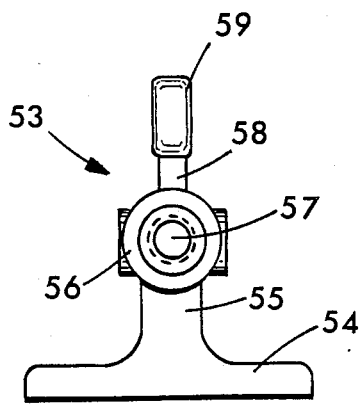
FIG. 8 is a frontal plan view of the clamping member of FIG. 7.

FIG. 7 shows another embodiment of the clamping member which is adjustably slidable in an elongated track member 12. The clamping member embodiment 53 is designed to impart a greater tensioning force on the screen fabric material because of its configuration. For example, its use in conjunction with the stretcher module 17 can exert a force of about 600 lbs. as opposed to 300 lbs. for the clamping member embodiment 16.

The clamping member 53 has a base portion 54 which, by means of screws 51 and 52 for example, is attached to sliding plate body 20. The clamping member 53 further has a body portion 55 having a frontal portion with a support cylinder 56 and a rear portion with a pivot member 63. A handle member 58 with handle grip 59 is pivotally attached at pivot member 62. Further, the sliding shaft 57 has an internally threaded aperture to receive the threaded adjustment member 26 described with respect to clamping member embodiment 16. The shaft 57 slidably extends through support cylinder 56 and is attached at pivot member 61. In conjunction with the structural member portions 64 and 65, the sliding shaft 57 is moved in a rearward direction as the handle portion 58 is moved in an upward and rearward manner. As with the clamping member embodiment 16, the clamping member 53 locks in position when the handle member 58 is extended rearwardly past the vertical or upright position to thereby lock the attached stretcher module 17 in position.

In use, a frame structure is initially placed centrally on the mounting board or base member 27 so that it rests on the frame support members 11. The frame structure is then shimmed so that it extends above the modules 17. Next, with the adjustable set screws 21 and the adjustment member 26 in a loose or untightened state, the stretcher modules 17 are abutted against the outside perimeter of the frame structure. The set screws 21 are then tightened to secure the clamping members 16 with respect to the track members 12.

A sheet of screen fabric material 60 is placed to cover the stretcher modules 17 whereby the needles 44 of the needle bar body 43 extend through the screen fabric material 60 or whereby other screen fabric grasping means are utilized to firmly hold the fabric along the stretcher modules 17. To ensure that all needles 44 of the needle rows 45, 46 and 47 extend through the fabric material 60 for proper grasping, a brush is preferably utilized to prevent injury to the fingers of a user. After properly adjusting and tightening adjustment members 26, the handle members 25 are moved in a rearward direction to tension or stretch the fabric material across the frame structure. A tensiometer device can then be utilized to ensure that the fabric is uniformly stretched across the frame structure. Any bagginess or uneven portions can be removed by readjusting the closest stretcher module 17 by moving the clamping member 16 on track 12 or by moving the adjustment members 26.

Although the adjustable stretcher devices discussed above have been with reference to frame structures having a planar rectangular configuration, these devices can also be utilized to stretch screen fabric materials over curved frame structures. For example, frames having simple curved (planar) and compound curved (curved cross-section) configurations can also be fitted with screen fabric materials using the biaxial stretchers of this invention. The fabric material, i.e., polyester or nylon, assumes the shape of the elevated curved frame structure as the stretcher device is utilized.

As many changes are possible to the embodiments of this invention utilizing the teachings thereof, the descriptions above, and the accompanying drawings should be interpreted in the illustrative and not in the limited sense.

That which is claimed is:

1. An adjustable stretcher device for positioning and holding frame structures of various dimensions and for biaxially tensioning a screen fabric across the frame structures, said adjustable stretcher comprising:
    (a) a generally flat base member for supporting the remaining elements of the device,
    (b) a pair of elongated opposing and perpendicularly disposed track members for securement to said base member, said track members having securement means to fasten said track members to said base member in a generally radial position from the center of said base member, each said track member further having an internally disposed sliding groove along its length,
    (c) a clamping member for slidingly engaging each said track member, each said clamping members having a sliding plate body for slidably engaging said internally disposed groove members of said track members and having an adjustable set screw means, a handle member, an elongated connector shaft in communication with said handle member and a shaft support cylinder mounted to said sliding plate body, each said connector shaft further having a widened end portion, and
    (d) an elongated stretcher module body having a body member, and further having a longitudinally extending channel member for slidingly receiving the widened end portion of said connector shaft, whereby the movement of the clamping members on said track members, the movement of said stretcher module body on said widened end portion of said connector shaft and the movement of the handle member of said clamping member permits a user to adjust the tension of screen fabric material biaxially across a frame structure placed within the adjustable perimeter of said elongated stretcher module bodies.

2. The adjustable stretcher device of claim 1, wherein each said elongated connector shaft of said clamping member is constructed of a two part shaft structure having an internally threaded connector shaft member and an externally threaded adjustment member, said adjustment member having a knurled adjustment nut and said widened end portion at its end to provide further tensioning adjustment means by permitting the movement of said widened end with respect to said internally threaded connector shaft member.

3. The adjustable stretcher device of claim 1, wherein said clamping member is constructed and arranged to provide a locked position when said handle member is moved beyond a vertical position.

4. The adjustable stretcher device of claim 1, wherein said device has two pairs of spacially parallel and opposing rail members secured to said base member and additionally having clamping members slidingly engaging each said track member, whereby a pair of each said clamping members slidingly engages one said elongated stretcher module.

5. The adjustable stretcher device of claim 1, wherein each said stretcher module body has a sloping shoulder portion with protruding needles that are disposed at a predetermined angle of approximately seventy-five degrees with respect to said sloping shoulder portion of said stretcher module.

6. The adjustable stretcher device of claim 5, wherein said protruding needles are comprised of a plurality of bar sections and wherein said bar sections have three rows of needles extending therefrom.

7. The adjustable stretcher device of claim 1, wherein frame support members are additionally provided for placement between said base member and said elongated stretcher module bodies for supporting the frame structure and said stretcher module bodies.

8. The adjustable stretcher device of claim 1, wherein each said sliding plate body has a pair of set screw means for securing said plate body in the track of said track member.

9. The adjustable stretcher device of claim 1, wherein the stretcher module body has a sloping shoulder portion of a predetermined slope and wherein said predetermined slope of said module body shoulder is approximately thirty degrees.

10. The adjustable stretcher device of claim 1, wherein said stretcher module has a sloping shoulder portion and further having an internally disposed elongated apertured channel section at said sloping shoulder portion, said shoulder module further having a plurality of outwardly protruding needles extending from said sloping shoulder portion.

11. The adjustable stretcher device of claim 1, wherein said flat base member is provided with apertured handle portions at its periphery.

12. An adjustable stretcher device for positioning and holding frame structure of various dimensions and for bidirectionally tensioning a screen fabric across the interiorly positioned frame structures, said adjustable stretcher comprising:

(a) a base member for supporting the remaining elements of the device,
(b) a pair of opposing and perpendicularly disposed rail members for fastening to said base member,
(c) clamping members for slidingly engaging each said rail members, each said clamping members having a sliding plate body, an adjustable locking means, a connector end, a handle member and a connector shaft in communication with said handle member, and
(d) stretcher modules each having a longitudinally extending channel member for adjustably receiving the connector ends of said clamping member connector shafts, said stretcher modules further having a screen fabric engaging portion and means to grasp and hold the screen fabric along the length of screen contact for stretching.

13. The adjustable stretcher device of claim 12, wherein each said connector shaft of said clamping member is constructed of a two part shaft structure having an internally threaded connector shaft member, and an externally threaded adjustment member, said threaded adjustment member further having a knurled adjustment nut fixed thereto and having said connector end to provide further tensioning adjustment means by permitting the relative movement of said connector end to said internally threaded connector shaft member.

14. The adjustable stretcher device of claim 12, wherein said means to grasp and hold the screen fabric of said stretcher module is comprised of said module body member having a sloping shoulder portion of a predetermined angle and a plurality of outwardly protruding needles extending therefrom at a predetermined angle with respect to said sloping shoulder portion.

15. The adjustable stretcher device of claim 14, the predetermined slope of said module body shoulder is approximately thirty degrees, and wherein said protruding needles are disposed at a predetermined angle of approximately seventy-five degrees with respect to said sloping shoulder portion of said stretcher module.

16. The adjustable stretcher device of claim 12, wherein said clamping member is constructed and arranged to provide a locked position when said handle member is moved beyond a vertical position.

17. The adjustable stretcher device of claim 12, wherein said device has two pairs of spacially parallel and opposing rail members secured to said base member and additionally having clamping members slidingly engaging each said rail member, whereby a pair of each said clamping members slidingly engages one said elongated stretcher module.

18. The adjustable stretcher device of claim 12, wherein a plurality of frame support members are provided for placement adjacent perpendicularly disposed rail members and beneath said stretcher modules for supporting the frame structure and said stretcher modules.

19. The adjustable stretcher device of claim 12, wherein each said sliding plate body has a pair of set screw means for securing said plate body in the rail of said rail member.

20. The adjustable stretcher device of claim 12, wherein said base member is further provided with apertured handle portions at its periphery.

* * * * *